(12) United States Patent
Takahashi

(10) Patent No.: US 9,796,818 B2
(45) Date of Patent: Oct. 24, 2017

(54) METHOD FOR PRODUCING RUBBER COMPOSITION

(71) Applicant: TOYO TIRE & RUBBER CO., LTD., Osaka-shi, Osaka (JP)

(72) Inventor: Hiroyuki Takahashi, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 32 days.

(21) Appl. No.: 15/158,659

(22) Filed: May 19, 2016

(65) Prior Publication Data

US 2016/0340477 A1 Nov. 24, 2016

(30) Foreign Application Priority Data

May 21, 2015 (JP) ................. 2015-103758

(51) Int. Cl.
*C08J 3/20* (2006.01)
*C08J 3/00* (2006.01)
*C08L 9/06* (2006.01)

(52) U.S. Cl.
CPC ............ *C08J 3/203* (2013.01); *C08J 3/005* (2013.01); *C08L 9/06* (2013.01); *C08J 2309/06* (2013.01); *C08J 2409/00* (2013.01); *C08J 2409/06* (2013.01); *C08L 2205/02* (2013.01); *C08L 2205/03* (2013.01)

(58) Field of Classification Search
CPC ........ C08J 3/203; C08J 3/005; C08J 2309/06; C08J 2409/00; C08J 2409/06; C08L 9/06; C08L 2205/02; C08L 2205/03

USPC ......................................... 524/526
See application file for complete search history.

(56) References Cited

U.S. PATENT DOCUMENTS

2013/0153102 A1* 6/2013 Zhao ................. C08L 9/00
152/209.5

FOREIGN PATENT DOCUMENTS

| CN | 104356454 A | 2/2015 |
|----|-------------|--------|
| JP | 7-188461 A | 7/1995 |
| JP | 2001-233994 A | 8/2001 |
| JP | 2009-235191 A | 10/2009 |
| JP | 2014-84410 A | 5/2014 |

OTHER PUBLICATIONS

English language machine translation of JP 2009-235191, Oct. 2009.*
Office Action dated Aug. 2, 2017, issued in counterpart Chinese Application No. 201610341247.9, with English machine translation. (18 pages).

* cited by examiner

*Primary Examiner* — Angela C Scott
(74) *Attorney, Agent, or Firm* — Westerman, Hattori, Daniels & Adrian, LLP

(57) ABSTRACT

A method for producing a rubber composition, which comprises kneading 20 parts by mass or more of silica with 100 parts by mass of diene rubber, and adding from 3 to 20 parts by mass of syndiotactic-1,2-polybutadiene to the kneaded mixture obtained, followed by kneading is disclosed. This method brings out characteristics of syndiotactic-1,2-polybutadiene and can improve wet grip performance.

11 Claims, No Drawings

METHOD FOR PRODUCING RUBBER COMPOSITION

CROSS-REFERENCE TO RELATED APPLICATIONS

This application is based upon and claims the benefit of priority from the prior Japanese Patent Application No. 2015-103758, filed on May 21, 2015; the entire contents of which are incorporated herein by reference.

BACKGROUND

1. Technical Field

The present invention relates to a method for producing a rubber composition and a method for manufacturing a pneumatic tire, and further relates to a rubber composition and a pneumatic tire obtained by the respective methods.

2. Related Art

Styrene-butadiene rubber having large styrene unit content is conventionally used in a rubber composition used in, for example, a pneumatic tire in order to improve grip performance (wet grip performance) on a wet road surface. However, use of the styrene-butadiene rubber having high styrene content involves deterioration of low temperature performance, abrasion resistance, low heat generation performance (low rolling resistance) and the like.

Furthermore, it is known to add syndiotactic-1,2-polybutadiene (hereinafter referred to as "SPB") to a silica-containing rubber composition using the silica as a filler. For example, JP-A-07-188461 discloses that SPB having a melting point of from 120 to 180° C. is added to diene rubber together with silica for the purpose of improving low rolling resistance and processability without deteriorating abrasion resistance, fracture resistance and wet grip performance.

JP-A-2001-233994 discloses that a polymeric compound having a melting point of from 80 to 230° C. is added to diene rubber in order to improve the performance of ice controlling action while maintaining wet grip performance, and SPB is exemplified as the polymeric compound.

JP-A-2009-235191 discloses to add SPB to modified styrene-butadiene rubber having a functional group in order to improve processability while maintaining the balance among abrasion resistance, fracture characteristics, low heat generation performance and wet grip performance.

JP-A-2014-084410 discloses that to improve low rolling resistance without deteriorating abrasion resistance, diene rubber is kneaded with SPB having a melting point of 110° C. or lower to prepare a dry master batch and silica is then added to the dry master batch, followed by kneading.

In those prior arts, SPB is added to diene rubber in the same kneading step as silica, or SPB is previously kneaded with diene rubber, and silica is then added to the kneaded mixture obtained, followed by kneading.

It is generally considered that a resin having a melting point higher than room temperature has the effect of improving wet grip performance. However, due to that SPB is compatible with silica, it is difficult to sufficiently bring out the performance of SPB in the above-described prior arts, and the effect of improving wet grip performance is poor.

SUMMARY

In view of the above, the present embodiment has an object to provide a method for producing a rubber composition that can bring out the performance of syndiotactic-1,2-polybutadiene.

The method for producing a rubber composition according to the present embodiment includes kneading 20 parts by mass or more of silica with 100 parts by mass of diene rubber, and adding from 3 to 20 parts by mass of syndiotactic-1,2-polybutadiene to the kneaded mixture obtained, followed by kneading.

A rubber composition according to the present embodiment is a rubber composition obtained by the production method.

A pneumatic tire according to the present embodiment is a pneumatic tire using the rubber composition.

A method for manufacturing a pneumatic tire according to the present embodiment includes preparing an unvulcanized tire using a rubber composition obtained by the above-described method for producing a rubber composition, and vulcanization-molding the unvulcanized tire.

According to the present embodiment, the performance of SPB can be brought out by previously kneading diene rubber with silica, and adding SPB to the kneaded mixture obtained, followed by kneading.

DETAILED DESCRIPTION

Matters concerning carrying out of embodiments are described in detail below.

The method for producing a rubber composition according to the present embodiment comprises adding silica to diene rubber, kneading the resulting mixture, adding syndiotactic-1,2-polybutadiene (SPB) to the kneaded mixture obtained, and kneading the resulting mixture.

Generally, it is effective to increase loss tangent tan $\delta$ in the vicinity of from −10 to 10° C. for the improvement of wet grip performance. A resin having high melting point generally has the effect of improving wet grip performance by increasing loss tangent tan S in the vicinity of from −10 to 10° C. SPB is such a resin, and therefore, the same effect can be expected in SPB. Particularly, SPB having a melting point of 110° C. or lower has a peak temperature of tan $\delta$ in the vicinity of from −10 to 10° C., and therefore the inventor considered that such SPB is advantageous to improve wet grip performance without deteriorating low heat generation performance. However, SPB is compatible with silica, and therefore is easy to take in silica. The mixing of silica into SPB deteriorates the effect of improving wet grip performance. In detail, when silica is mixed into SPB, a peak value of tan $\delta$ by SPB is decreased. Furthermore, compatibility between SPB and diene rubber is increased by that a shear effect during kneading is increased by the mixing of silica into SPB. The peak temperature of tan $\delta$ by SPB shifts by the influence of the compatibility between the diene rubber and SPB, and it becomes difficult to sufficiently exhibit the original performance of increasing tan $\delta$ in the vicinity of from −10 to 10° C. On the other hand, according to the present embodiment, by previously kneading diene rubber with silica and kneading SPB with the kneaded mixture obtained, the mixing of silica into SPB can be suppressed and phase separation between the diene rubber and SPB can be accelerated. As a result, it is possible to bring out the performance of SPB and to improve wet grip performance.

Acceleration of phase separation between diene rubber and SPB is advantageous to maintain low temperature performance of a rubber composition. It is considered that the reason for this is as follows. Low temperature performance depends on diene rubber present as a matrix (continuous phase) in a rubber composition. Therefore, if SPB is phase-separated as a disperse phase from the diene rubber, it is considered that low temperature performance is exhibited by the diene rubber as a matrix. On the other hand, if the phase separation between the diene rubber and SPB is insufficient, the characteristics as such a sea-island structure are not exhibited, and it is considered that the original low temperature performance of the diene rubber becomes difficult to be exhibited by the influence of compatibilized SPB.

Diene Rubber

Examples of the diene rubber that can be used as a rubber component in the present embodiment include natural rubber (NR), polyisoprene rubber (IR), polybutadiene rubber (BR), styrene-butadiene rubber (SBR), styrene-isoprene copolymer rubber and butadiene-isoprene copolymer rubber. Those diene rubbers can be used alone or as mixtures of two or more kinds. The diene rubber is more preferably at least one selected from the group consisting of NR, SBR, and BR, and still more preferably SBR alone or a blend of SBR and BR and/or NR. In one embodiment, 100 parts by mass of the diene rubber may comprise from 50 to 90 parts by mass of SBR and from 10 to 50 parts by mass of BR.

Furthermore, a modified diene rubber modified with a functional group having an interaction (reactivity, affinity) with a silanol group on a silica surface may be used as the diene rubber. When the diene rubber contains a modified diene rubber, silica is further easy to be mixed into the diene rubber, and the mixing of silica into SPB can be further reduced. Examples of the modified diene rubber include modified diene rubbers modified with a functional group by incorporating at least one functional group selected from the group consisting of a hydroxyl group, an amino group, a carboxyl group, a carboxylic acid derivative group, an alkoxyl group, an alkoxysilyl group, an epoxy group, a thiol group, and a halogen into a molecular terminal or molecular chain of the diene rubbers exemplified above. The amino group is not only a primary amino group, but may be a secondary or tertiary amino group. Examples of the carboxylic acid derivative group include an acid anhydride group comprising an anhydride of dicarboxylic acid, and a carboxylic acid ester group. Examples of the alkoxyl group include a methoxy group and ethoxy group represented by —OR (wherein R represents, for example, an alkyl group having from 1 to 4 carbon atoms). Examples of the alkoxysilyl group include groups in which at least one of three hydrogen atoms of a silyl group is substituted with an alkoxyl group, such as a trialkoxysilyl group and alkyl dialkoxysilyl group. Examples of the halogen include fluorine, chlorine, bromine and iodine. Of those functional groups, at least one selected from the group consisting of a hydroxyl group, an amino group, a carboxyl group, an alkoxyl group, and an alkoxysilyl group is preferred.

The modified diene rubber is preferably modified SBR and/or modified BR. The diene rubber as a rubber component may be modified diene rubber alone and may be a blend of modified diene rubber and unmodified diene rubber. In detail, the diene rubber as a rubber component may contain 10 parts by mass or more of modified SBR in 100 parts by mass of the diene rubber, or may contain from 20 to 50 parts by mass of modified SBR and from 50 to 80 parts by mass of at least one unmodified diene rubber selected from the group consisting of unmodified SBR, unmodified BR, and unmodified NR in 100 parts by mass of the diene rubber.

In the present embodiment, the diene rubber is preferably that the content of vinyl bond unit in the entire polymer constituting the diene rubber (hereinafter referred to "vinyl content Vi in rubber component" or simply "Vi") is from 10 to 25 mass %. When the Vi is 10 mass % or more, deterioration of abrasion resistance can be suppressed. Furthermore, when the Vi is 25 mass % or less, deterioration of low temperature can be suppressed. The Vi is preferably 15 mass % or more.

Examples of the constituent unit of the diene rubber include a butadiene moiety derived from 1,3-bitadiene, an isoprene moiety derived from isoprene, a styrene moiety derived from styrene and the like. Of those moieties, examples of the constituent constituting a conjugated diene moiety such as a butadiene moiety or an isoprene moiety include a cis-1,4 bond unit, a trans-1,4 bond unit, a vinyl-1,2 bond unit and a vinyl-3,4 bond unit. The vinyl content Vi in the rubber component is the content of vinyl bond units contained in the entire constituent units of the diene rubber constituting the rubber component, and is the total content of a vinyl-1,2 bond unit and a vinyl-3,4 bond unit. Those constituent units of the diene rubber can be measured by FT-IR (Fourier-transform infrared spectroscopy). In more detail, the constituent units of BR, NR and IR are obtained by Morello method, and the constituents units of SBR are obtained by Hampton-Morello method. In the case of using a blend of plural kinds of diene rubbers, the vinyl content Vi (mass %) in the rubber component can be obtained by a proportional calculation according to the amounts added from the content of a vinyl bond unit measured in each diene rubber (that is, in each diene rubber, the content (mass %) of vinyl bond unit contained in all of constituent units constituting the rubber polymer).

Syndiotactic-1,2-Polybutadiene (SPB)

In the present embodiment, it is preferred to use SPB in which a 1,2-vinyl bond content is 70 mol % or more and the degree of crystallinity is from 5 to 50% as the SPB from the standpoint of wet grip performance. The peak temperature of tan δ of SPB can be adjusted by the 1,2-vinyl bond content and the degree of crystallinity. SPB in which the 1,2-vinyl bond content is preferably 90 mol % or more and the degree of crystallinity is preferably from 15 to 35% (more preferably from 15 to 30%) has the peak temperature of tan δ in the vicinity of from −10 to 10° C. and therefore can improve wet grip performance while suppressing deterioration of low heat generation performance. The 1,2-vinyl bond content of SPB is a value obtained by an infrared absorption spectrometry (Morello method). The degree of crystallinity is a value converted from a density measured by a substitution method in water when a density of 1,2-polybutadiene having the degree of crystallinity of 0% is 0.889 g/cm$^3$ and a density of 1,2-polybutadiene having the degree of crystallinity of 100% is 0.963 g/cm$^3$.

As an example, SPB is obtained by polymerizing butadiene in the presence of a polymerization catalyst containing a cobalt compound (for example, an organic acid salt between an organic acid having 4 or more carbon atoms and cobalt), aluminooxane (for example, methyl aluminooxane or ethyl aluminooxane), and preferably further a phosphine compound. The SPB is disclosed in JP-A-2009-235191, and SPB disclosed in this patent document can be used.

It is preferred to use SPB having a melting point of 110° C. or lower as the SPB. By using the SPB having low melting point, wet grip performance can be improved while suppressing deterioration of low heat generation performance (low rolling resistance). The SPB has a melting point of preferably from 30 to 110° C., more preferably from 60 to 110° C., and still more preferably from 70 to 100° C. The melting point is a fusion peak temperature of a DSC curve measured according to JIS K7121.

The content of SPB in the rubber composition is preferably from 3 to 20 parts by mass per 100 parts by mass of the diene rubber. The content can achieve both wet grip performance and low heat generation performance while maintaining flexibility at low temperature. The content of the SPB is more preferably from 5 to 15 parts by mass. Where the content of SPB is too large, abrasion resistance and low temperature performance tend to be deteriorated. Therefore, the upper limit of the content is preferably 20 parts by mass or less. The SPB corresponds to a resin having high rigidity, rather than a rubber component, and therefore is not included in the diene rubber.

Silica

In the present embodiment, silica as a filler is not particularly limited, but wet silica such as wet precipitated silica or wet gelled silica is preferably used. Colloidal properties of the silica are not particularly limited, and for example, silica having nitrogen adsorption specific surface area (BET) by BET method of from 90 to 250 $m^2/g$ may be used, and silica having the BET of from 150 to 230 $m^2/g$ may be used. The BET of silica is measured according to BET method defined in ISO 5794.

The content of silica in the rubber composition is not particularly limited, but is, for example, preferably from 20 to 120 parts by mass per 100 parts by mass of the diene rubber. The content of silica may be from 30 to 100 parts by mass, and may be from 40 to 80 parts by mass, per 100 parts by mass of the diene rubber.

Other Components

In the rubber composition according to the present embodiment, the filler may be silica alone, and may be a blend of silica and other filler. The other filler is preferably carbon black, but an inorganic filler such as clay or talc may be used. The amount of the other filler added including carbon black is that the proportion of the other filler occupied in the entire filler is preferably 50 mass % or less, and more preferably 30 mass % or less. Therefore, the amount of silica added is preferably 50 mass % or more, and more preferably 70 mass % or more, based on the entire filler. The amount of the entire filler added is not particularly limited, and the amount may be from 20 to 150 parts by mass or may be from 40 to 100 parts by mass, per 100 parts by mass of the diene rubber. The amount of the other filler added is not particularly limited, and the amount may be from 20 parts by mass or less per 100 parts by mass of the diene rubber. Carbon black may be added in an amount of from 2 to 10 parts by mass for the purpose of, for example, coloration of a tire.

Silane coupling agent may be added to the rubber composition according to the present embodiment. The amount of the silane coupling agent added is not particularly limited, but is preferably from 2 to 25 parts by mass per 100 parts by mass of the silica. The silane coupling agent is not particularly limited, and examples thereof include sulfide silane coupling agents such as bis(3-triethoxysilylpropyl)tetrasulfide, bis(3-triethoxysilylpropyl)disulfide, bis(2-triethoxysilylethyl)tetrasulfide or bis(3-trimethoxysilylpropyl)tetrasulfide; mercaptosilane coupling agents such as 3-mercaptopropyltrimethoxysilane, 3-mercaptopropyltriethoxysilane or 3-mercaptopropylmethyldimethoxysilane; and protected mercaptosilane coupling agents such as 3-octanoylthio-1-propyltriethoxysilane or 3-propionylthiopropyltrimethoxysilane. Those silane coupling agents can be used alone or as mixtures of two or more kinds thereof.

The rubber composition according to the present embodiment can contain various additives generally used in a rubber composition, such as a wax, stearic acid, zinc flower, an age resister, an oil, a vulcanizing agent or a vulcanization accelerator, in addition to the above-described components.

The vulcanizing agent is not particularly limited, and examples thereof include sulfur such as powdered sulfur, precipitated sulfur, colloidal sulfur, insoluble sulfur and highly dispersive sulfur, and those can be used alone or as mixtures of two or more kinds thereof. The amount of the vulcanizing agent added may be from 0.1 to 10 parts by mass and may be from 0.5 to 5 parts by mass, per 100 parts by mass of the diene rubber.

The vulcanization accelerator is not particularly limited, and examples thereof include a sulfenamide type such as N-cyclohexyl-2-benzothiazolylsulfenamide (CBS), N-tert-butyl-2-benzothiazolylsulfenamide (BBS), N-oxydiethylene-2-benzothiazolylsulfenamide (OBS) or N,N-diisopropyl-2-benzothiazolylsulfenamide (DPBS); a thiuram type such as tetramethylthiuram disulfide (TMTD) or tetrabutylthiuram disulfide (TBTD); a guanidine type such as 1,3-diphenylguanidine (DPG) or 1,3-di-o-tolylguanidine (DOTG); and a thiazole type such as dibenzothiazolyldisulfide (MBTS) or 2-mercaptobenzothiazole (MBT). Those vulcanization accelerators can be used alone or as mixtures of two or more kinds thereof. As one embodiment, the vulcanization accelerator may be at least one selected from the group consisting of a sulfenamide type vulcanization accelerator and a quanidine type vulcanization accelerator. The amount of the vulcanization accelerator added is preferably from 0.1 to 7 parts by mass, and more preferably from 0.5 to 5 parts by mass, per 100 parts by mass of the diene rubber.

Method for Producing Rubber Composition

A method for producing a rubber composition according to the present embodiment comprises:

(1) a first kneading step of adding 20 parts by mass or more of silica to 100 parts by mass of a diene rubber, followed by kneading the resulting mixture to prepare a first kneaded mixture; and (2) a second kneading step of adding from 3 to 20 parts by mass of SPB to the first kneaded mixture obtained, followed by kneading the resulting mixture to prepare a second kneaded mixture.

The first kneading step and second kneading step may be conducted as a nonproductive mixing process, and the following third kneading step may be conducted as a productive mixing process after the second kneading step. This production method is hereinafter referred to as a method (A).

(3) A third kneading step of adding a vulcanizing agent and a vulcanization accelerator to the second kneaded mixture, followed by kneading the resulting mixture to prepare a rubber composition according to the present embodiment.

The first kneading step is conducted as a nonproductive mixing process, the second kneading step is conducted as a productive mixing process, and in the second kneading step, a vulcanizing agent and a vulcanization accelerator may be added together with SPB, followed by kneading. In this case, the second kneaded mixture corresponds to the rubber composition according to the present embodiment. This production method is hereinafter referred to as a method (B).

In the present embodiment, silica is added in an amount of 20 parts by mass or more per 100 parts by mass of the diene rubber in the first kneading step. This suppresses the mixing of silica into SPB in the second kneading step as a next step, can accelerate phase separation between the diene rubber and SPB, and can improve wet grip performance. Where the amount of the silica kneaded in the first kneading step is too small, not only the effect of improving wet grip performance is not obtained, but also low temperature performance is deteriorated. For this reason, the amount of the silica kneaded in the first kneading step is preferably 25 parts by mass or more, and more preferably 30 parts by mass or more, per 100 parts by mass of the diene rubber.

In the present embodiment, in the first kneading step, the entire amount of silica to be contained in the rubber composition may be kneaded with the diene rubber to prepare the above kneaded mixture (that is, first kneaded mixture). Thus, by adding the entire amount of the silica in the first kneading step, silica is not added in the second kneading step. For this reason, the mixing of silica into SPB added in the second mixing step can be further suppressed, and phase separation between the diene rubber and SPB can be further accelerated. As a result, a peak by the diene rubber and a peak by SPB can be separated or can become tangible in a tan δ curve of the rubber composition. As a result, the effect of improving wet grip performance can be enhanced, and additionally the deterioration of low temperature performance can be further effectively suppressed.

The ratio of the amount of silica added in the first kneading step to the amount of silica finally contained in the rubber composition (that is, the entire amount of silica) is not particularly limited, but is preferably 30 mass % or more, more preferably 50 mass % or more, and still more preferably 60 mass % or more.

In the first kneading step, ingredients such as other filler as an optional component, a silane coupling agent, a wax, stearic acid, zinc flower, an age resister or an oil may be added together with the diene rubber and silica, followed by kneading. However, SPB is not added. Furthermore, the kneading is conducted without adding a vulcanizing agent and a vulcanization accelerator.

In the second kneading step, SPB is added to the first kneaded mixture obtained in the first kneading step. In this case, the amount of SPB added is from 3 to 20 parts by mass per 100 parts by mass of the diene rubber contained in the first kneaded mixture. In the case of the method (A) above, in the second kneading step, only SPB may be added. Alternatively, the remainder of silica may be added together with SPB, and other components such as a wax, stearic acid, zinc flower, an age resister and an oil may be added, followed by kneading. In the case of adding the remainder of silica, it is preferred to add a silane coupling agent. In the case of the method (B) above, in the second kneading step, a vulcanizing agent and a vulcanization accelerator are added together with SPB, followed by kneading.

The third kneading step can be carried out as an ordinary processing kneading process according to the conventional method.

The nonproductive mixing process (the first kneading step, and the second kneading step in the method (A)) can be conducted using a kneading machine such as Banbury mixer, a kneader or rolls, as a closed kneading machine. Each component is introduced in the kneading machine, and kneading that is dry mixing to which mechanical shear force has been added is conducted. When kneaded, temperature is increased by heat generation by shearing. Therefore, a kneaded mixture (nonproductive rubber mixture) is discharged from the kneading machine at a given discharge temperature. The upper limit of the kneading temperature in a nonproductive mixing process (that is, a discharge temperature from a kneading machine) is not particularly limited, and may be, for example, from 130 to 180° C. or from 140 to 180° C. In the second kneading step of kneading SPB, it is preferred to discharge at a temperature of a melting point or higher of SPB. Mixing time is basically controlled by a discharge temperature and is not particularly limited. The mixing time is preferably from 30 to 300 seconds. The nonproductive rubber mixture discharged from the kneading machine is generally cooled by allowing it to stand at room temperature.

The productive mixing process (the third kneading step, and the second kneading step in the method (B)) can be conducted by using a kneading machine such as open rolls or Banbury mixer. A vulcanizing agent and a vulcanization accelerator are introduced together with the nonproductive rubber mixture into the kneading machine (SPB is also introduced in the method (B)), kneading is performed, and the kneaded mixture is discharged from the kneading machine at a given discharge temperature. The upper limit of the kneading temperature (that is, discharge temperature from the kneading machine) in the productive mixing process is preferably from 80 to 120° C., and more preferably from 90 to 110° C., in order to suppress the reaction of a vulcanizing agent and a vulcanization accelerator. However, in the method (B), the kneaded mixture is preferably discharged at a temperature of a melting point or higher of SPB in order to improve dispersibility of SPB.

The first kneading step may be a single kneading step, but may be carried out by dividing into a plurality of kneading steps that repeat kneading and discharging. Furthermore, a remilling process that conducts only kneading without adding an additive may be carried out between the first kneading step and the second kneading step, and/or between the second kneading step and the third kneading step.

Uses of the rubber composition thus obtained are not particularly limited, and the rubber composition can be applied to each site such as a tread part or a side wall part in pneumatic tires having various uses and various sizes, such as tires for passenger cars, or heavy load tires for trucks or buses. Furthermore, the rubber composition can be applied to general summer tires, and additionally are preferably used in tires for winter season or tires for all seasons so long as low temperature performance is maintained.

The pneumatic tire can be manufactured using the rubber composition according to the present embodiment according to the conventional method. For example, the pneumatic tire can be manufactured by forming the rubber composition into a given shape (for example, a tread rubber member) by extrusion processing or the like, combining it with other parts to manufacture an unvulcanized tire (green tire), and then vulcanization molding the unvulcanized tire at a temperature of, for example, from 140 to 180° C. The rubber composition is preferably used in a tread rubber constituting a ground contact surface of a pneumatic tire. The tread part of a pneumatic tire includes a tread part comprising a two layer structure of a cap rubber and a base rubber, and a tread part comprising an integrated single layer structure of those, and in each case, the rubber composition is preferably used in a rubber constituting a ground contact surface. That is, in the case of a single layer structure, the tread rubber preferably comprises the rubber composition, and in the case of a two layer structure, the cap rubber preferably comprises the rubber composition.

EXAMPLES

Examples of the present embodiment are described below, but the present embodiment is not construed as being limited to those examples. Raw materials used in examples and comparative examples, and evaluation methods of a rubber composition are as follows.

Raw Materials

SBR-1: Solution polymerized styrene-butadiene rubber, styrene unit content: 21 mass %, vinyl bond unit content: 49 mass %, "Nipol NS116R" manufactured by Zeon Corporation SBR-2: Hydroxyl group end-modified solution polymerized styrene-butadiene rubber, styrene unit content: 21 mass %, vinyl bond unit content: 49 mass %, "Nipol NS616" manufactured by Zeon Corporation SBR-3: Solution polymerized styrene-butadiene rubber, styrene unit content: 17 mass %, vinyl bond unit content: 9 mass %, "TUFDENE 1834" manufactured by Asahi Kasei Corporation BR: Polybutadiene, vinyl bond unit content: 2 mass %, "BR150B" manufactured by Ube Industries, Ltd.

Silica: "NIPSIL AQ" manufactured by Tosoh Silica Corporation (BET: 205 $m^2/g$)

Carbon black: N339, "SEAST KH" manufactured by Tokai Carbon Co., Ltd.

Coupling agent: Sulfide silane coupling agent, "Si75" manufactured by Evonik Degussa Wax: "OZOACE 0355" manufactured by Nippon Seiro Co., Ltd.

Stearic acid: "LUNAC S-20" manufactured by Kao Corporation

Zinc flower: "Zinc Flower #1" manufactured by Mitsui Mining & Smelting Co., Ltd.

Age resister: "NOCRAC 6C" manufactured by Ouchi Shinko Chemical Industrial Co., Ltd.

Oil: "PROCESS NC140" manufactured by JX Nippon Oil & Energy Corporation

SPB-1: Syndiotactic-1,2-polybutadine having melting point: 95° C., 1,2-vinyl bond content: 92 mol % and degree of crystallinity: 25%, "RB820" manufactured by JSR Corporation SPB-2: Syndiotactic-1,2-polybutadine having melting point: 126° C., 1,2-vinyl bond content: 94 mol % and degree of crystallinity: 36%, "RB840" manufactured by JSR Corporation Vulcanization accelerator 1: DPC "NOCCELER D" manufactured by Ouchi Shinko Chemical Industrial Co., Ltd.

Vulcanization accelerator 2: CBS, "SOXINOL CZ" manufactured by Sumitomo Chemical Co., Ltd.

Sulfur: "POWDERED SULFUR" manufactured by Tsurumi Chemical Industry Co., Ltd.

In SBR-1 to 3, the vinyl bond unit content is the content of vinyl bond unit content (mass %) contained in all of constituent units (entire constituent units of styrene moiety and butadiene moiety) constituting the polymer.

Evaluation Method

Low temperature performance: Storage modulus E' was measured under the conditions of frequency: 10 Hz, static strain: 10%, dynamic strain: ±0.25% and temperature: −15° C. using a viscoelasticity tester manufactured by Toyo Seiki Seisaku-Sho Ltd., and was indicated by an index as values of Comparative Examples A to E being 100 in each table.

The results show that low temperature performance when used in a tire is excellent as the index is small. When the index is less than 120, it says that low temperature performance is not greatly deteriorated.

Abrasion resistance: Abrasion loss was measured under the conditions of load: 40N and slip ratio: 30% according to JIS K6264 using Lambourn abrasion tester manufactured by Iwamoto Seisakusho Co., Ltd., and was indicated by an index as an inverse number of abrasion loss as Comparative Examples A to E being 100 in each table. The results show that abrasion loss is small as the index is large and abrasion resistance is excellent. When the index is 90 or more, it says that abrasion resistance is not greatly deteriorated.

Wet grip performance: Loss factor tan δ was measured under the conditions of frequency: 10 Hz, static strain: 10%, dynamic strain: ±1% and temperature: 0° C. using a viscoelasticity tester manufactured by Toyo Seiki Seisaku-Sho Ltd., and was indicated by an index as values of Comparative Examples A to E being 100 in each table. The results show that loss factor tan δ is large as the index is large and wet grip performance when used in a tire is excellent. When the index is 105 or more, it says that the improvement effect is achieved.

Low heat generation performance: Loss factor tan δ was measured under the conditions of frequency: 10 Hz, static strain: 10%, dynamic strain: ±1% and temperature: 60° C. using a viscoelasticity testing machine manufactured by Toyo Seiki Seisaku-Sho Ltd., and was indicated by an index as values of Comparative Examples A to E being 100 in each table. The results show that loss factor tan δ is small as the index is small and low heat generation performance is excellent, and as a result, rolling resistance when used in a tire is small and low fuel consumption is excellent. When the index is less than 105, it says that low heat generation performance is not greatly deteriorated.

First Example

Banbury mixer was used. Rubber compositions for a tire tread of Comparative Examples A and A-1 to A-4 and Examples A-1 to A-6 were prepared according to the formulations (parts by mass) shown in Table 1 below. In detail, rubber compositions were prepared by the following method, except for Example A-4. In step 1 (nonproductive mixing process), each component shown in the column of Step 1 was added to diene rubber, followed by kneading. A first kneaded mixture was discharged from Banbury mixer at a discharge temperature of 160° C., and was allowed to stand at room temperature, thereby cooling the first kneaded mixture. In step 2 (nonproductive mixing process), the first kneaded mixture was fed to Banbury mixer, each component shown in the column of Step 2 was added, following by kneading, and a second kneaded mixture was discharged from Banbury mixer at a discharge temperature of 160° C., and was allowed to stand at room temperature, thereby cooling the second kneaded mixture. In step 3 (productive mixing process), the second kneaded mixture was fed to Banbury mixer, each component shown in the column of Step 3 was added, following by kneading, and the resulting kneaded mixture was discharged from Banbury mixer at a discharge temperature of 110° C. Thus, a rubber composition for a tire tread was obtained. In Example A-4, a rubber composition for a tire tread was prepared in the same manner as in the other examples, except that only first kneaded mixture was re-kneaded without adding a new component in step 2.

Low temperature performance, abrasion resistance, wet grip performance and low heat generation performance of each rubber composition obtained were evaluated by using a test piece having a given shape obtained by vulcanizing each rubber composition at 150° C. for 30 minutes.

The results obtained are shown in Table 1. As compared with Comparative Example A as a control, in Comparative Example A-2 in which SPB had been kneaded together with diene rubber and silica in step 1, despite that SPB is added, tan δ in the vicinity of 0° C. could not be increased by the mixing of silica into SPB and compatibilization between SPB and diene rubber, and the effect of improving wet grip performance was not obtained. Furthermore, low temperature performance was greatly deteriorated by the compatibilization between SPB and diene rubber. In Comparative Example A-1, SPB was added in step 2, but the amount of SPB added is too small, and the effect of improving wet grip performance could not be substantially obtained. On the other hand, in Comparative Example A-4, the amount of SPB added is too large, low temperature performance was greatly deteriorated and abrasion resistance was impaired. In Comparative Example A-3, the amount of silica added in step 1 is small, silica added in step 2 is mixed into SPB, and it could not bring out the performance of SPB. As a result, further improving wet grip performance was obtained, and deterioration of low temperature performance was further suppressed. In Example A-6, as compared with Example A-1, the amount of SPB added was increased. As a result, the balance between wet grip performance and low heat generation performance was further improved. In Example A-5, the effect of improving wet grip performance was obtained, but a melting point of SPB was high. As a result, abrasion resistance was slightly deteriorated, and additionally low heat generation performance was deteriorated. It therefore says that lower melting point of SPB is preferred from the standpoint of low heat generation performance.

TABLE 1

|  | Comparative Example | | | | | Example | | | | | |
| --- | --- | --- | --- | --- | --- | --- | --- | --- | --- | --- | --- |
|  | A | A-1 | A-2 | A-3 | A-4 | A-1 | A-2 | A-3 | A-4 | A-5 | A-6 |
| Formulation (Parts by mass) | | | | | | | | | | | |
| Step 1 | | | | | | | | | | | |
| SBR-1 | 40 | 40 | 40 | 40 | 40 | 40 | 40 | 40 | 40 | 40 | 40 |
| SBR-3 | 30 | 30 | 30 | 30 | 30 | 30 | 30 | 30 | 30 | 30 | 30 |
| BR | 30 | 30 | 30 | 30 | 30 | 30 | 30 | 30 | 30 | 30 | 30 |
| Carbon black | 5 | 5 | 5 | 5 | 5 | 5 | 5 | 5 | 5 | 5 | 5 |
| Silica | 30 | 30 | 30 | 15 | 30 | 30 | 20 | 50 | 50 | 30 | 30 |
| Coupling agent | 2.4 | 2.4 | 2.4 | 1.2 | 2.4 | 2.4 | 1.6 | 4 | 4 | 2.4 | 2.4 |
| Wax | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 |
| Zinc flower | 2 | 2 | 2 | 2 | 2 | 2 | 2 | 2 | 2 | 2 | 2 |
| Age resister | 2 | 2 | 2 | 2 | 2 | 2 | 2 | 2 | 2 | 2 | 2 |
| Oil | 5 | 5 | 5 | 5 | 5 | 5 | 5 | 10 | 10 | 5 | 5 |
| SPB-1 |  |  | 5 |  |  |  |  |  |  |  |  |
| Step 2 | | | | | | | | | | | |
| Silica | 20 | 20 | 20 | 35 | 20 | 20 | 30 |  |  | 20 | 20 |
| Coupling agent | 1.6 | 1.6 | 1.6 | 2.8 | 1.6 | 1.6 | 2.4 |  |  | 1.6 | 1.6 |
| Oil | 5 | 5 | 5 | 5 | 5 | 5 | 5 |  |  | 5 | 5 |
| SPB-1 |  | 2 |  | 5 | 25 | 5 | 5 | 5 |  |  | 10 |
| SPB-2 |  |  |  |  |  |  |  |  |  | 5 |  |
| Step 3 | | | | | | | | | | | |
| Vulcanization accelerator 1 | 0.5 | 0.5 | 0.5 | 0.5 | 0.5 | 0.5 | 0.5 | 0.5 | 0.5 | 0.5 | 0.5 |
| Vulcanization accelerator 2 | 1.5 | 1.5 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 | 2 | 2 |
| SPB-1 |  |  |  |  |  |  |  |  | 5 |  |  |
| Vinyl content Vi in rubber component (mass %) | 23 | 23 | 23 | 23 | 23 | 23 | 23 | 23 | 23 | 23 | 23 |
| Evaluation (Index) | | | | | | | | | | | |
| Low temperature performance | 100 | 97 | 122 | 120 | 136 | 104 | 108 | 103 | 101 | 103 | 105 |
| Abrasion resistance | 100 | 101 | 102 | 102 | 82 | 100 | 100 | 98 | 103 | 94 | 97 |
| Wet grip performance | 100 | 102 | 98 | 100 | 120 | 110 | 107 | 115 | 118 | 113 | 115 |
| Low heat generation performance | 100 | 101 | 97 | 98 | 104 | 100 | 100 | 98 | 100 | 110 | 99 | the effect of improving wet grip performance was not obtained. Furthermore, low temperature performance was deteriorated by the compatibilization between diene rubber and SPB.

On the other hand, in Examples A-1 to A-6 in which diene rubber was previously kneaded with silica and SPB was kneaded with the resulting kneaded mixture in the next step, the effect of improving wet grip performance was obtained. In detail, in Examples A-1 and A-2, as compared with Example A, deterioration of low temperature performance could be suppressed, and wet grip performance could be improved while maintaining abrasion resistance and low heat generation performance. In Examples A-3 and A-4, the entire amount of silica was added, followed by kneading, in step 1. Therefore, the mixing of silica into SPB was further effectively suppressed, and phase separation between diene rubber and SPB was accelerated. As a result, the effect of Second Example Banbury mixer was used. Rubber compositions of Comparative Example B and Examples B-1 and B-2 were prepared according to the formulations (parts by mass) shown in Table 2 below. In detail, similar to First Example, each component shown in the column of Step 1 was added to and kneaded with diene rubber in step 1 (discharge temperature: 160° C.) to obtain a first kneaded mixture. The first kneaded mixture was fed to Banbury mixer, and each component shown in the column of Step 2 was added to and kneaded with the first kneaded mixture in step 2 (discharge temperature: 160° C.) to obtain a second kneaded mixture. The second kneaded mixture was fed to Banbury mixer and each component shown in the column of Step 3 was added to and kneaded with the second kneaded mixture (discharge temperature: 110° C.) to obtain a rubber composition. Low temperature performance, abrasion resistance, wet grip performance and low heat generation performance of each rubber composition obtained were evaluated in the same manners as in First Example.

Second Example differs from First Example in the composition of the rubber component, and the vinyl content Vi in the rubber component is 15 mass %, whereas 23 mass % in First Example. The results obtained are shown in Table 2 below. As compared with Comparative Example B as a control, in Examples B-1 and B-2, wet grip performance could be improved while substantially maintaining low temperature performance, abrasion resistance and low heat generation performance. Particularly, in Example B-2 in which the entire amount of silica was kneaded in step 1, the effect of further improving wet grip performance was obtained while further suppressing deterioration of low temperature performance.

TABLE 2

|  | Comparative Example B | Example B-1 | Example B-2 |
|---|---|---|---|
| Formulation (parts by mass) | | | |
| Step 1 | | | |
| SBR-1 | 20 | 20 | 20 |
| SBR-3 | 50 | 50 | 50 |
| BR | 30 | 30 | 30 |
| Carbon black | 5 | 5 | 5 |
| Silica | 30 | 30 | 50 |
| Coupling agent | 2.4 | 2.4 | 4 |
| Wax | 2 | 2 | 2 |
| Stearic acid | 2 | 2 | 2 |
| Zinc flower | 2 | 2 | 2 |
| Age resister | 2 | 2 | 2 |
| Oil | 5 | 5 | 10 |
| Step 2 | | | |
| Silica | 20 | 20 | |
| Coupling agent | 1.6 | 1.6 | |
| Oil | 5 | 5 | |
| SPB-1 | | 5 | 5 |
| Step 3 | | | |
| Vulcanization accelerator 1 | 0.5 | 0.5 | 0.5 |
| Vulcanization accelerator 2 | 1.5 | 1.5 | 1.5 |
| Sulfur | 2 | 2 | 2 |
| Vinyl content Vi in rubber component (mass %) | 15 | 15 | 15 |
| Evaluation (Index) | | | |
| Low temperature performance | 100 | 102 | 100 |
| Abrasion resistance | 100 | 97 | 97 |
| Wet grip performance | 100 | 109 | 112 |
| Low heat generation performance | 100 | 101 | 100 |

Third Example

Banbury mixer was used. Rubber compositions of Comparative Example C and Examples C-1 and C-2 were prepared according to the formulations (parts by mass) shown in Table 3 below. Third Example differs from Second Example in that modified SBR having an interaction with silica was used as a rubber component, and other elements are the same as in Second Example. Low temperature performance, abrasion resistance, wet grip performance and low heat generation performance of each rubber composition obtained were evaluated in the same manners as in Second Example. The results obtained are shown in Table 3 below. Similar to Second Example, in Examples C-1 and C-2, as compared with Comparative Example C as a control, wet grip performance could be improved while substantially maintaining low temperature performance, abrasion resistance and low heat generation performance. By using modified SBR, the improvement in wet grip performance to the control was large as compared with First Example and Second Example.

TABLE 3

|  | Comparative Example C | Example C-1 | Example C-2 |
|---|---|---|---|
| Formulation (parts by mass) | | | |
| Step 1 | | | |
| SBR-2 | 40 | 40 | 40 |
| SBR-3 | 30 | 30 | 30 |
| BR | 30 | 30 | 30 |
| Carbon black | 5 | 5 | 5 |
| Silica | 30 | 30 | 50 |
| Coupling agent | 2.4 | 2.4 | 4 |
| Wax | 2 | 2 | 2 |
| Stearic acid | 2 | 2 | 2 |
| Zinc flower | 2 | 2 | 2 |
| Age resister | 2 | 2 | 2 |
| Oil | 5 | 5 | 10 |
| Step 2 | | | |
| Silica | 20 | 20 | |
| Coupling agent | 1.6 | 1.6 | |
| Oil | 5 | 5 | |
| SPB-1 | | 5 | 5 |
| Step 3 | | | |
| Vulcanization accelerator 1 | 0.5 | 0.5 | 0.5 |
| Vulcanization accelerator 2 | 1.5 | 1.5 | 1.5 |
| Sulfur | 2 | 2 | 2 |
| Vinyl content Vi in rubber component (mass %) | 23 | 23 | 23 |
| Evaluation (Index) | | | |
| Low temperature performance | 100 | 103 | 102 |
| Abrasion resistance | 100 | 100 | 102 |
| Wet grip performance | 100 | 114 | 118 |
| Low heat generation performance | 100 | 99 | 98 |

Fourth Example

Banbury mixer was used. Rubber compositions of Comparative Example D and Examples D-1 and D-2 were prepared according to the formulations (parts by mass) shown in Table 4 below. Fourth Example differs from Second Example in the composition of the rubber component, and the vinyl content Vi in the rubber component is 7 mass %, whereas 15 mass % in Second Example. Other elements are the same as in Second Example. Low temperature performance, abrasion resistance, wet grip performance and low heat generation performance of each rubber composition obtained were evaluated. The results obtained are shown in Table 4 below. In Examples D-1 and D-2, as compared with Comparative Example D as a control, wet grip performance could be improved while substantially maintaining low temperature performance and low heat generation performance. However, abrasion resistance was slightly deteriorated. It is understood from this fact that it is preferred that the vinyl content Vi in the rubber component is larger than 7 mass %.

TABLE 4

|  | Comparative Example D | Example D-1 | Example D-2 |
|---|---|---|---|
| Formulation (parts by mass) Step 1 | | | |
| SBR-3 | 70 | 70 | 70 |
| BR | 30 | 30 | 30 |
| Carbon black | 5 | 5 | 5 |
| Silica | 30 | 30 | 50 |
| Coupling agent | 2.4 | 2.4 | 4 |
| Wax | 2 | 2 | 2 |
| Stearic acid | 2 | 2 | 2 |
| Zinc flower | 2 | 2 | 2 |
| Age resister | 2 | 2 | 2 |
| Oil | 5 | 5 | 10 |
| Step 2 | | | |
| Silica | | 20 | 20 |
| Coupling agent | | 1.6 | 1.6 |
| Oil | | 5 | 5 |
| SPB-1 | | 5 | 5 |
| Step 3 | | | |
| Vulcanization accelerator 1 | 0.5 | 0.5 | 0.5 |
| Vulcanization accelerator 2 | 1.5 | 1.5 | 1.5 |
| Sulfur | 2 | 2 | 2 |
| Vinyl content Vi in rubber component (mass %) | 7 | 7 | 7 |
| Evaluation (Index) | | | |
| Low temperature performance | 100 | 106 | 104 |
| Abrasion resistance | 100 | 92 | 93 |
| Wet grip performance | 100 | 105 | 107 |
| Low heat generation performance | 100 | 102 | 100 |

Fifth Example

Banbury mixer was used. Rubber compositions of Comparative Example E and Examples E-1 and E-2 were prepared according to the formulations (parts by mass) shown in Table 5 below. Fifth Example differs from Second Example in the composition of the rubber component, and the vinyl content Vi in the rubber component is 28 mass %, whereas 15 mass % in Second Example. Other elements are the same as in Second Example. Low temperature performance, abrasion resistance, wet grip performance and low heat generation performance of each rubber composition obtained were evaluated. The results obtained are shown in Table 5 below. In Examples E-1 and E-2, as compared with Comparative Example E as a control, wet grip performance could be improved while substantially maintaining abrasion resistance and low heat generation performance. However, low temperature performance was slightly deteriorated. It is understood from this fact that it is preferred that the vinyl content Vi in the rubber component is smaller than 28 mass %.

TABLE 5

|  | Comparative Example E | Example E-1 | Example E-2 |
|---|---|---|---|
| Formulation (parts by mass) Step 1 | | | |
| SBR-1 | 50 | 50 | 50 |
| SBR-3 | 20 | 20 | 20 |
| BR | 30 | 30 | 30 |
| Carbon black | 5 | 5 | 5 |
| Silica | 30 | 30 | 50 |
| Coupling agent | 2.4 | 2.4 | 4 |
| Wax | 2 | 2 | 2 |
| Stearic acid | 2 | 2 | 2 |
| Zinc flower | 2 | 2 | 2 |
| Age resister | 2 | 2 | 2 |
| Oil | 5 | 5 | 10 |
| Step 2 | | | |
| Silica | 20 | 20 | |
| Coupling agent | 1.6 | 1.6 | |
| Oil | 5 | 5 | |
| SPB-1 | | 5 | 5 |
| Step 3 | | | |
| Vulcanization accelerator 1 | 0.5 | 0.5 | 0.5 |
| Vulcanization accelerator 2 | 1.5 | 1.5 | 1.5 |
| Sulfur | 2 | 2 | 2 |
| Vinyl content Vi in rubber component (mass %) | 28 | 28 | 28 |
| Evaluation (Index) | | | |
| Low temperature performance | 100 | 112 | 110 |
| Abrasion resistance | 100 | 98 | 97 |
| Wet grip performance | 100 | 106 | 109 |
| Low heat generation performance | 100 | 98 | 100 |

What is claimed is:

1. A method for producing a rubber composition, comprising kneading 20 parts by mass or more of silica with 100 parts by mass of diene rubber to form a kneaded mixture, and adding from 3 to 20 parts by mass of syndiotactic-1,2-polybutadiene to the kneaded mixture obtained, followed by kneading.

2. The method for producing a rubber composition according to claim 1, wherein the syndiotactic-1,2-polybutadiene has a melting point of 110° C. or lower.

3. The method for producing a rubber composition according to claim 1, wherein the diene rubber is such that the content of a vinyl bond unit in the entire polymer constituting the diene rubber is from 10 to 25 mass %.

4. The method for producing a rubber composition according to claim 1, wherein the kneaded mixture is prepared by kneading the entire amount of silica to be contained in the rubber composition with the diene rubber.

5. The method for producing a rubber composition according to claim 1, wherein the diene rubber comprises a modified diene rubber modified with a functional group having an interaction with a silanol group on a silica surface.

6. The method for producing a rubber composition according to claim 1, wherein the syndiotactic-1,2-polybutadiene has a 1,2-vinyl bond content of 70 mol % or more and the degree of crystallinity of from 5 to 50%.

7. The method for producing a rubber composition according to claim 1, wherein the kneaded mixture is prepared without adding syndiotactic-1,2-polybutadiene in the step of kneading the silica with the diene rubber.

8. The method for producing a rubber composition according to claim 1, further comprising adding a vulcanizing agent and a vulcanization accelerator to a second kneaded mixture obtained by adding the syndiotactic-1,2-polybutadiene to the kneaded mixture.

9. The method for producing a rubber composition according to claim 1, wherein a vulcanizing agent and a vulcanization accelerator are added to the kneaded mixture together with the syndiotactic-1,2-polybutadiene followed by kneading.

10. The method for producing a rubber composition according to claim 1, wherein the syndiotactic-1,2-polybutadiene is phase-separated as a disperse phase from the diene rubber constituting a continuous phase in the rubber composition obtained.

11. A method for manufacturing a pneumatic tire, comprising:
  kneading 20 parts by mass or more of silica with 100 parts by mass of diene rubber to form a kneaded mixture,
  adding from 3 to 20 parts by mass of syndiotactic-1,2-polybutadiene to the kneaded mixture obtained, followed by kneading to obtain a rubber composition,
  manufacturing an unvulcanized tire using the rubber composition, and vulcanization-molding the unvulcanized tire.

* * * * *